United States Patent
Murase

(10) Patent No.: US 12,017,479 B2
(45) Date of Patent: Jun. 25, 2024

(54) PNEUMATIC TIRE

(71) Applicant: The Yokohama Rubber Co., LTD., Tokyo (JP)

(72) Inventor: Keisuke Murase, Kanagawa (JP)

(73) Assignee: he Yokohama Rubber Co., LTD., Tokyo (JP)

( * ) Notice: Subject to any disclaimer, the term of this patent is extended or adjusted under 35 U.S.C. 154(b) by 607 days.

(21) Appl. No.: 17/269,463

(22) PCT Filed: Aug. 19, 2019

(86) PCT No.: PCT/JP2019/032268
§ 371 (c)(1),
(2) Date: Feb. 18, 2021

(87) PCT Pub. No.: WO2020/040084
PCT Pub. Date: Feb. 27, 2020

(65) Prior Publication Data
US 2021/0252912 A1 Aug. 19, 2021

(30) Foreign Application Priority Data
Aug. 20, 2018 (JP) .................................. 2018-153913

(51) Int. Cl.
*B60C 1/00* (2006.01)
*C08F 36/06* (2006.01)
(Continued)

(52) U.S. Cl.
CPC ............ *B60C 1/0016* (2013.01); *C08F 36/06* (2013.01); *C08K 3/36* (2013.01); *C08K 5/548* (2013.01); *C08L 9/06* (2013.01); *C08L 91/00* (2013.01); *C08K 2201/006* (2013.01)

(58) Field of Classification Search
CPC ....... B60C 1/006; B60C 1/0016; C08F 36/06; C08L 9/06; C08K 3/36
See application file for complete search history.

(56) References Cited

U.S. PATENT DOCUMENTS

2011/0144236 A1 6/2011 Mihara
2015/0031791 A1 1/2015 Sugiura
(Continued)

FOREIGN PATENT DOCUMENTS

| CN | 104220510 A | 12/2014 |
| CN | 104245817 A | 12/2014 |

(Continued)

OTHER PUBLICATIONS

JP 2019-001845 Machine Translation (Year: 2019).*

*Primary Examiner* — Justin R Fischer
*Assistant Examiner* — Wendy L Boss
(74) *Attorney, Agent, or Firm* — Thorpe North & Western

(57) ABSTRACT

A pneumatic tire having dry grip performance, wet grip performance, low rolling resistance, and performance on snow, formed by: molding a rubber composition for a tire, the rubber composition containing: from 70 to 150 parts by mass of silica per 100 parts by mass of a diene rubber formed from two types of modified styrene butadiene rubbers and a butadiene rubber, and oil, and from 5 to 15 mass % of 3-octanoylthio-1-propyltriethoxysilane with respect to a mass of the silica, the diene rubber containing 75 mass % or greater and less than 100 mass % total of the two types of modified styrene butadiene rubbers and greater than 0 mass % and 25 mass % or less of the butadiene rubber, a total amount of oil component containing the oil being from 25 to 45 mass % of a total mass of filler containing the silica, and a glass transition temperature being −50° C. or lower.

6 Claims, 1 Drawing Sheet

(51) Int. Cl.
  *C08K 3/36* (2006.01)
  *C08K 5/548* (2006.01)
  *C08L 9/06* (2006.01)
  *C08L 91/00* (2006.01)

(56) References Cited

U.S. PATENT DOCUMENTS

| | | | |
|---|---|---|---|
| 2015/0126643 A1* | 5/2015 | Satou | B60C 1/00 523/156 |
| 2015/0148447 A1 | 5/2015 | Takeda | |
| 2017/0174876 A1 | 6/2017 | Maejima | |
| 2017/0283519 A1* | 10/2017 | Iizuka | C08C 19/30 |

FOREIGN PATENT DOCUMENTS

| | | |
|---|---|---|
| CN | 106164158 A | 11/2016 |
| CN | 109641480 A | 4/2019 |
| DE | 10 2010 062 557 A1 | 9/2011 |
| EP | 3500440 A1 | 6/2019 |
| JP | 2013-166864 A | 8/2013 |
| JP | 2013-227375 A | 11/2013 |
| JP | 2015-196814 A | 11/2015 |
| JP | 2016-069551 A | 5/2016 |
| JP | 2017-008241 A | 1/2017 |
| JP | 6329187 B2 | 5/2018 |
| JP | 2018-095701 A | 6/2018 |
| JP | 2019001845 A * | 1/2019 |
| JP | 2019-065240 A | 4/2019 |
| JP | 2019-524956 A | 9/2019 |
| KR | 10-2014-0117693 A | 10/2014 |
| KR | 10-2014-0130568 A | 11/2014 |
| KR | 10-2016-0096219 A | 8/2016 |
| WO | 2013/122237 A1 | 8/2013 |
| WO | 2013/161876 A1 | 10/2013 |
| WO | 2015/152398 A1 | 10/2015 |
| WO | 2018/033508 A1 | 2/2018 |
| WO | 2019/070016 A1 | 4/2019 |

* cited by examiner

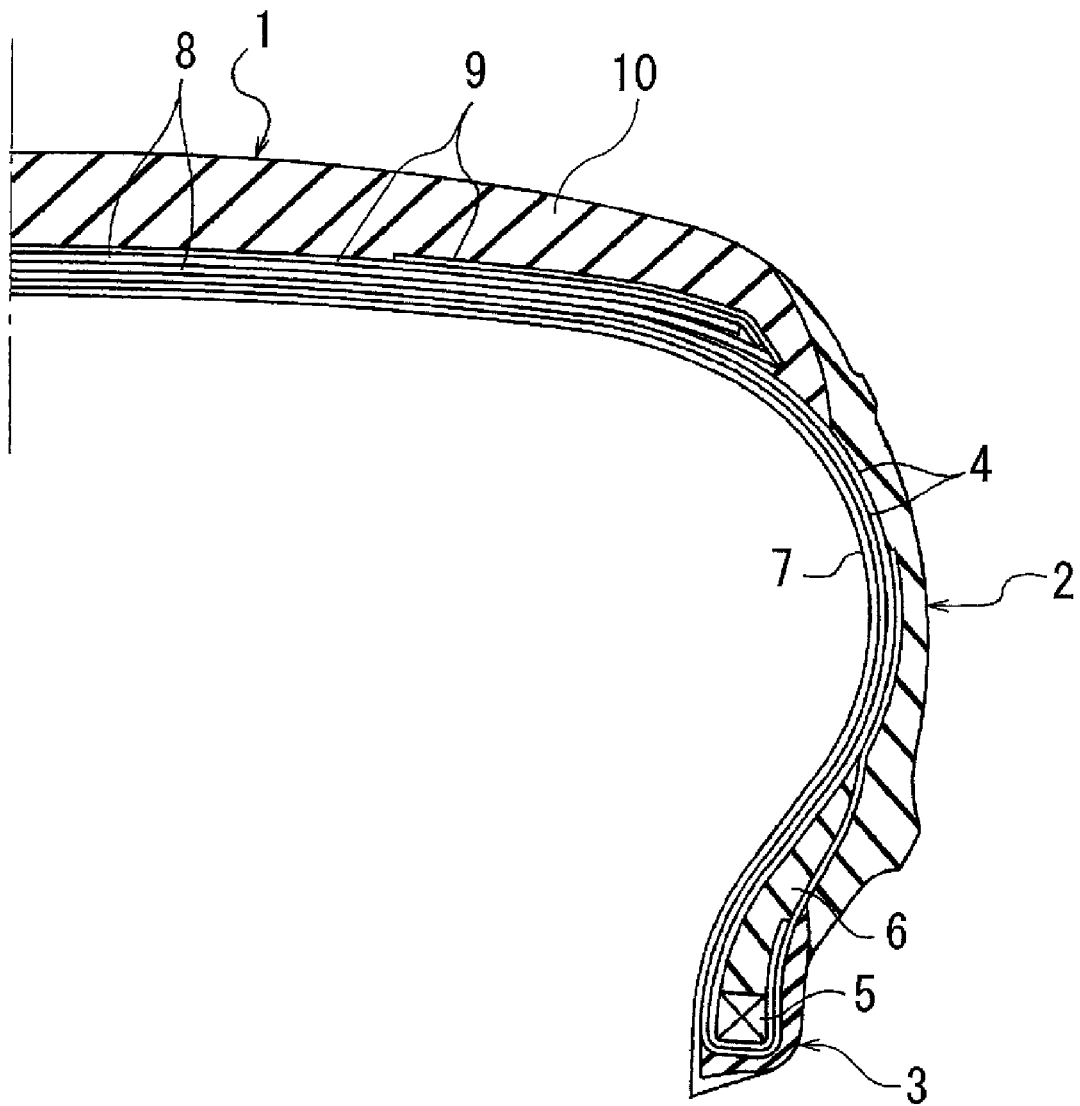

PNEUMATIC TIRE

TECHNICAL FIELD

The present technology relates to a pneumatic tire having excellent dry grip performance, wet grip performance, low rolling resistance, and performance on snow.

BACKGROUND ART

All-season tires mounted on a high performance vehicle have been required to have high performance on snow in addition to excellent dry grip performance and wet grip performance to enhance safety and low rolling resistance to enhance fuel economy performance. However, it is difficult to provide these characteristics in a compatible manner to a high degree because these characteristics are contrary to each other. For example, there are cases where a large content of butadiene rubber is contained to lower the glass transition temperature of a rubber composition to enhance the performance on snow. However, problems occur in that dispersibility of silica is reduced, and dry grip performance, wet grip performance, and low rolling resistance are deteriorated.

Japan Patent No. 6329187 describes that a tire for all seasons, the tire prioritizing wet grip performance, grip performance on ice, and low rolling resistance, is produced by a rubber composition which contains a natural rubber, a butadiene rubber, a styrene-butadiene rubber, silica, and a plasticizer and in which contents of these satisfy a special relationship formula. However, performance required for a pneumatic tire for all seasons required by consumers is even higher, and thus further enhancement has been demanded.

SUMMARY

The present technology provides a pneumatic tire having excellent dry grip performance, wet grip performance, low rolling resistance, and performance on snow.

A pneumatic tire according to the present technology is formed by molding a rubber composition for a tire, the rubber composition containing: from 70 to 150 parts by mass of silica per 100 parts by mass of a diene rubber formed from two types of modified styrene-butadiene rubbers and a butadiene rubber, and an oil, and from 5 to 15 mass % of 3-octanoylthio-1-propyltriethoxysilane with respect to a mass of the silica, the diene rubber containing 75 mass % or greater and less than 100 mass % total of the two types of modified styrene-butadiene rubbers and greater than 0 mass % and 25 mass % or less of the butadiene rubber, a total amount of oil component containing the oil being from 25 to 45 mass % of a total mass of filler containing the silica, and a glass transition temperature being −50° C. or lower.

According to a pneumatic tire according to an embodiment of the present technology, because a tread portion is formed by molding the rubber composition for a tire described above, even better dispersibility of silica can be achieved, and thus a rubber composition for a tire having excellent dry grip performance, wet grip performance, low rolling resistance, and performance on snow can be obtained.

In the rubber composition for a tire, preferably, both weight average molecular weights of the two types of modified styrene-butadiene rubbers are 400000 or greater, and a difference between glass transition temperatures of the two types of modified styrene-butadiene rubbers is 20° C. or higher, and even better balance of dry grip performance, wet grip performance, low rolling resistance, and performance on snow can be achieved.

In the rubber composition for a tire, preferably, at least one of the two types of modified styrene-butadiene rubbers has an alkoxysilyl group, and even better balance of dry grip performance, wet grip performance, low rolling resistance, and performance on snow can be achieved.

In the rubber composition for a tire, preferably, as the silica, silica having a CTAB (cetyltrimethylammonium bromide) adsorption specific surface area of 140 $m^2/g$ or greater and less than 180 $m^2/g$ and silica having a CTAB adsorption specific surface area of from 180 $m^2/g$ to 250 $m^2/g$ are blended, and even lower rolling resistance can be achieved.

The pneumatic tire according to an embodiment of the present technology has excellent performances as the pneumatic tire for all seasons and, in particular, can provide dry grip performance, wet grip performance, low rolling resistance, and performance on snow in a compatible manner to a high degree by forming the tread portion by molding the rubber composition for a tire.

BRIEF DESCRIPTION OF DRAWINGS

The Drawing is a partial cross-sectional view illustrating an example of a pneumatic tire according to an embodiment of the present technology in a tire meridian direction.

DETAILED DESCRIPTION

The Drawing is a partial cross-sectional view illustrating an example of a pneumatic tire according to an embodiment in a tire meridian direction. The pneumatic tire includes a tread portion 1, a side portion 2, and a bead portion 3.

In the Drawing, two carcass layers 4 in which reinforcing cords extending in a tire radial direction are disposed at a predetermined distance in a tire circumferential direction and are embedded in a rubber layer extend between left and right side bead portions 3, and both ends of the two carcass layers 4 are folded back from the inside to the outside in a tire axial direction around a bead core 5 that is embedded in each of the bead portions 3 so that a bead filler 6 is wrapped. An innerliner layer 7 is disposed inward of the carcass layers 4. Two belt layers 8 in which reinforcing cords extending at an incline with respect to the tire circumferential direction are disposed at a predetermined distance in the tire axial direction and are embedded in the rubber layer are disposed on the outer circumferential side of the carcass layers 4 of the tread portion 1. These reinforcing cords of the two belt layers 8 are disposed in a criss-cross manner with opposite inclination directions with respect to the tire circumferential direction. Furthermore, a belt cover layer 9 is disposed on the outer circumferential side of the belt layer 8. A tread rubber 10 is disposed on an outer circumferential side of the belt cover layer 9 and constitutes the tread portion 1. Furthermore, on the outer side in tire width direction of the carcass layer 4, a side rubber is disposed and constitutes the side portion 2.

In a pneumatic tire according to an embodiment of the present technology, a rubber composition forming the tread portion 1 and/or the side portion 2 contains from 70 to 150 parts by mass of silica per 100 parts by mass of a diene rubber formed from two types of modified styrene-butadiene rubbers and a butadiene rubber, and an oil, and from 5 to 15 mass % of 3-octanoylthio-1-propyltriethoxysilane with respect to a mass of the silica, the diene rubber containing 75 mass % or greater and less than 100 mass % total of the two types of modified styrene-butadiene rubbers and greater than 0 mass % and 25 mass % or less of the butadiene rubber, a total amount of oil component containing the oil being from 25 to 45 mass % of a total mass of filler containing the silica, and a glass transition temperature being −50° C. or lower.

The diene rubber is formed from two types of modified styrene-butadiene rubbers and a butadiene rubber. The butadiene rubber is not particularly limited as long as the butadiene rubber is a butadiene rubber that is typically used for a rubber composition for a tire. Because the butadiene rubber has a low glass transition temperature, the butadiene rubber can enhance performance on snow by being blended in a rubber composition for a tire. However, when the butadiene rubber is blended, dispersibility of silica may be deteriorated, and by this, sufficient enhancement of dry grip performance, wet grip performance, and low rolling resistance may not be achieved. Meanwhile, by employing the configuration of the present technology, dispersibility of silica can be made excellent even in the presence of butadiene rubber and excellent balance of dry grip performance, wet grip performance, low rolling resistance, and performance on snow can be achieved.

The content of the butadiene rubber is greater than 0 mass % and 25 mass % or less, preferably from 6 to 23 mass %, and more preferably from 10 to 21 mass %, per 100 mass % of the diene rubber. When no butadiene rubber is contained, the performance on snow cannot be sufficiently enhanced. When the butadiene rubber is greater than 25 mass %, dry grip performance is deteriorated.

The diene rubber contains two types of modified styrene-butadiene rubbers. The two types of modified styrene-butadiene rubbers refer to two types of modified styrene-butadiene rubbers of which at least one selected from type of modification group, degree of modification, and type of styrene-butadiene rubber (e.g., polymerization method, catalyst, styrene content, vinyl content, and molecular weight) differs from each other. The two types of modified styrene-butadiene rubbers of which the type of modification group and the type of styrene-butadiene rubber differ from each other are preferred.

The type of the modification group is not particularly limited and examples thereof include an epoxy group, carboxy group, amino group, hydroxy group, alkoxy group, silyl group, alkoxysilyl group, amide group, oxysilyl group, silanol group, isocyanate group, isothiocyanate group, carbonyl group, and aldehyde group. An alkoxysilyl group, amino group, hydroxy group, alkoxy group, silyl group, aminosilyl group, and glycidyl group are preferred, for example. Furthermore, at least one of the two types of modified styrene-butadiene rubbers preferably has a hydroxy group. By allowing a styrene-butadiene rubber containing a hydroxy group to be contained, even better dispersibility of silica can be achieved.

The weight average molecular weight of each of the two types of modified styrene-butadiene rubbers is preferably 400000 or greater, and more preferably from 420000 to 1400000. Setting both weight average molecular weights of the modified styrene-butadiene rubbers to 400000 or greater is preferred because even lower rolling resistance can be achieved. Additionally, high wear resistance can also be achieved. The weight average molecular weights of the modified styrene-butadiene rubbers can be increased or decreased by, for example, polymerization conditions. The weight average molecular weights of the modified styrene-butadiene rubbers can be measured by gel permeation chromatography (GPC) based on calibration with polystyrene standards.

The glass transition temperatures of the two types of modified styrene-butadiene rubbers are different from each other, and the difference between the two glass transition temperatures is preferably 20° C. or higher, and more preferably from 25° C. to 50° C. By setting the difference between the glass transition temperatures of the modified styrene-butadiene rubbers to 20° C. or higher, performance on snow can be improved. The glass transition temperatures of the modified styrene-butadiene rubbers can be adjusted by changing, for example, styrene amounts, vinyl amounts, and weight average molecular weights. The glass transition temperature of each of the modified styrene-butadiene rubbers can be measured by using a differential scanning calorimeter (DSC) at a temperature elevation speed of 10° C./min and calculated based on the midpoint method. Note that, when each of the modified styrene-butadiene rubbers contains an oil-extending component, the glass transition temperature of the modified styrene-butadiene rubber without the oil-extending component or before addition of the oil-extending component is determined.

In the two types of modified styrene-butadiene rubbers, the combination of the types of the modification groups and the glass transition temperatures is not particularly limited. For example, the glass transition temperature of the styrene-butadiene rubber containing an alkoxysilyl group is preferably lower than the glass transition temperature of the styrene-butadiene rubber containing a modification group other than the alkoxysilyl group, and by this, even better dispersibility of the silica can be achieved.

The total content of the two types of modified styrene-butadiene rubbers is 75 mass % or greater and less than 100 mass %, preferably from 76 to 92 mass %, and more preferably from 77 to 90 mass %, per 100 mass % of the diene rubber. When the total content of the two types of modified styrene-butadiene rubbers is less than 75 mass %, dispersibility of silica cannot be sufficiently enhanced. When the diene rubber is formed only from the two types of modified styrene-butadiene rubbers, performance on snow cannot be sufficiently enhanced.

For the contents of the two types of modified styrene-butadiene rubbers, the mass ratio thereof is not particularly limited; however, the ratio of the content of the modified styrene-butadiene rubber having a higher glass transition temperature (M1 part by mass) to the content of the modified styrene-butadiene rubber having a lower glass transition temperature (M2 part by mass) (M1/M2) is preferably from 25/75 to 75/25, and more preferably from 40/60 to 60/40. By setting the mass ratio (M1/M2) of the contents of the two types of modified styrene-butadiene rubbers to such a range, even better dispersibility of silica can be achieved.

For the rubber composition for a tire, in the diene rubber, the total of the two types of modified styrene-butadiene rubbers and the butadiene rubber is 100 mass %. However, a pneumatic tire according to an embodiment of the present technology does not prohibit reuse in its mixing process or molding process. For example, when a tread portion is green-molded by winding an unvulcanized sheet formed from the rubber composition around a predetermined position on a forming drum, a small piece of the unvulcanized sheet cut off before and after the winding of the unvulcanized sheet is sometimes reused in the process. At this time, the small piece of the unvulcanized sheet can be blended during the preparation of the rubber composition for a tire, so long as the present technology is not hindered. In the rubber composition for a tire, the amount of another diene rubber contained in the small piece of the unvulcanized sheet (e.g., natural rubber and unmodified styrene-butadiene rubber) is preferably 5 mass % or less, and more preferably 3 mass % or less, per 100 mass % of the diene rubber.

The rubber composition for a tire contains silica. Examples of the silica include wet silica (hydrous silicic acid), dry silica (silicic anhydride), calcium silicate, and aluminum silicate. One type of these can be used alone, or a combination of two or more types of these can be used. Furthermore, surface-treated silica, in which the surface of silica is surface-treated by a silane coupling agent, may be also used.

The CTAB adsorption specific surface area of the silica is not particularly limited, and is preferably from 140 to 300 $m^2/g$, and more preferably from 160 to 260 $m^2/g$. By setting the CTAB adsorption specific surface area of silica to 140 $m^2/g$ or greater, wet grip performance of the rubber composition can be ensured. Furthermore, by setting the CTAB adsorption specific surface area of silica to 300 $m^2/g$ or less, excellent dry grip performance, wet grip performance, and low rolling resistance can be achieved. In the present specification, the CTAB adsorption specific surface area of silica is a value measured in accordance with ISO 5794.

As the silica, two types of silicas having CTAB adsorption specific surface areas that differ from each other can be preferably used. The two types of silicas have CTAB adsorption specific surface areas that differ from each other, and the difference between the CTAB adsorption specific surface areas is preferably 20 $m^2/g$ or greater, and more preferably from 25 to 50 $m^2/g$. Setting the difference between the CTAB adsorption specific surface areas to 20 $m^2/g$ or greater can achieve even better dispersibility of silica.

The silica having the smaller CTAB adsorption specific surface area preferably has the CTAB adsorption specific surface area of preferably 140 $m^2/g$ or greater and less than 180 $m^2/g$, and more preferably from 150 to 175 $m^2/g$. On the other hand, the silica having the larger CTAB adsorption specific surface area preferably has the CTAB adsorption specific surface area of preferably from 180 $m^2/g$ to 250 $m^2/g$, and more preferably from 190 to 240 $m^2/g$. Setting the CTAB adsorption specific surface areas of the two types of silicas to such ranges can make rolling resistance low and can improve wet grip performance.

From 70 to 150 parts by mass, and preferably from 80 to 140 parts by mass, of the silica is blended per 100 parts by mass of the diene rubber. Setting the blended amount of the silica to 70 parts by mass or greater can enhance dry grip performance, wet grip performance, and low rolling resistance. Furthermore, setting the blended amount of the silica to 150 parts by mass or less can make dispersibility of silica excellent.

The rubber composition for a tire can contain another filler besides the silica. Examples of such another filler include carbon black, calcium carbonate, magnesium carbonate, talc, clay, alumina, aluminum hydroxide, titanium oxide, and calcium sulfate. Among these, carbon black is preferred. One type of these other fillers can be used alone, or a combination of two or more types of these can be used.

By allowing 3-octanoylthio-1-propyltriethoxysilane to be blended as a silane coupling agent, the rubber composition for a tire can enhance dispersibility of silica. From 5 to 15 mass %, and preferably from 6 to 14 mass %, of 3-octanoylthio-1-propyltriethoxysilane is blended with respect to the mass of the silica. Blending of 5 mass % or greater of 3-octanoylthio-1-propyltriethoxysilane can enhance dispersibility of silica. Furthermore, blending of 15 mass % or less of 3-octanoylthio-1-propyltriethoxy silane can suppress condensation of silane coupling agents and can provide a rubber composition having desired hardness and strength.

The rubber composition for a tire contains an oil. Examples of the oil include natural oils, synthetic oils, and oils added during preparation of a rubber composition such as plasticizers. Furthermore, an oil-extending component contained in the diene rubber is also an oil. In the rubber composition for a tire, the total amount of oil component including an oil added during preparation is decided with respect to the total mass of fillers including silica. That is, the total amount of the oil component including an oil is from 25 to 45 mass %, and preferably from 27 to 43 mass %, with respect to the total mass of the filler including silica. When the total amount of the oil component is less than 25 mass %, performance on snow is deteriorated. Furthermore, when the total amount is greater than 45 mass %, dry grip performance is deteriorated, and steering stability may be also insufficient.

The rubber composition for a tire has the glass transition temperature of −50° C. or lower, and preferably from −50 to −65° C. When the glass transition temperature of the rubber composition for a tire is higher than −50° C., performance on snow is deteriorated. The glass transition temperature of the rubber composition for a tire can be measured by using a differential scanning calorimeter (DSC) at a temperature elevation speed of 10° C./min and calculated based on the midpoint method. The glass transition temperature of the rubber composition for a tire can be calculated as the sum of the products each obtained by multiplying a glass transition temperature of each of the two types of modified styrene-butadiene rubbers, the butadiene rubber, and the oil and a mass fraction (a real number of greater than 0 and less than 1) of each of the components when the total of the contents of these components is 1 (weighted average value). Note that, when components each having a glass transition temperature, such as a liquid polymer or a terpene resin, are optionally contained, the glass transition temperature of the rubber composition for a tire is calculated by adding the glass transition temperatures and the mass fractions of these optional components.

The rubber composition for a tire may also contain various additives that are commonly used in the rubber composition for a tire within a range that does not impair the present technology. Examples thereof include a vulcanization or crosslinking agent, a vulcanization accelerator, an anti-aging agent, a plasticizer, a processing aid, a liquid polymer, a terpene resin, and a thermosetting resin. These additives may be kneaded by any commonly known method to form a rubber composition, and can be used for vulcanization or crosslinking. Blended amounts of these additives may be any known conventional amount, so long as the present technology is not hindered.

The pneumatic tire according to an embodiment of the present technology has, for example, a tread portion or side portion formed by molding the rubber composition for a tire described above and has excellent balance of dry grip performance, wet grip performance, low rolling resistance, and performance on snow to a high degree. The pneumatic tire preferably has excellent performances as the pneumatic tire for all seasons and, in particular, has the tread portion formed by molding the rubber composition for a tire. The pneumatic tire is a significantly high performance tire as a pneumatic tire for all seasons having excellent dry grip performance, wet grip performance, low rolling resistance, and performance on snow.

Embodiments according to the present technology are further described below by Examples. However, the scope of the present technology is not limited to these Examples.

Example

Each of rubber compositions for a tire (Examples 1 to 10, Standard Example, and Comparative Examples 1 to 7) was prepared according to the formulations shown in Tables 1 and 2 with the compounding agents shown in Table 3 used as common components. With the exception of the sulfur and the vulcanization accelerators, the components were kneaded in a 1.7 L sealed Banbury mixer for 5 minutes, then discharged from the mixer, and cooled at room temperature. This was placed in the 1.7 L sealed Banbury mixer, and the sulfur and the vulcanization accelerators were then added and mixed, and thus a rubber composition for a tire was prepared. Note that, in the rows of modified styrene-butadiene rubber (modified SBR-2) in Tables 1 and 2, the net blended amount, except the amount of the oil-extending component, of modified SBR is written in parentheses in addition to the blended amount of the product. Furthermore, the blended amounts of the compounding agents shown in Table 3 are expressed as values in part by mass per 100 parts by mass of the diene rubbers shown in Tables 1 and 2.

A vulcanization test piece was prepared by subjecting the obtained rubber composition for a tire to press vulcanization at 160° C. for 20 minutes by using a predetermined mold, and the glass transition temperature thereof was measured by using a differential scanning calorimeter (DSC) at a temperature elevation speed of 10° C./min and calculated based on the midpoint method. The glass transition temperatures are shown in Tables 1 and 2.

Eighteen types of pneumatic radial tires, in which the rubber composition for a tire obtained as described above was used in a tread rubber (tire size: 195/65R15), were vulcanization-molded, and dry grip performance, wet grip performance, performance on snow, steering stability, and rolling resistance were measured by the following test methods.

Dry Grip Performance

The pneumatic tire obtained as described above was mounted on a standard rim, inflated to an air pressure of 250 kPa, and mounted on a test vehicle. The test vehicle traveled on a dry road surface with relatively less protrusions and recesses, and a braking distance when the test vehicle braked at an initial speed of 100 km/hour was measured. Each of the obtained results is expressed as an index value obtained by calculating a reciprocal thereof, with Standard Example being assigned the value of 100, and shown in rows of "Dry grip performance" in Tables 1 and 2. A larger index value indicates a shorter braking distance, and the index value of 102 or greater indicates excellent dry grip performance.

Wet Grip Performance

The pneumatic tire obtained as described above was mounted on a standard rim, inflated to an air pressure of 250 kPa, and mounted on a test vehicle. The test vehicle traveled on a wet road surface with relatively less protrusions and recesses, and a braking distance when the test vehicle braked at an initial speed of 100 km/hour was measured. Each of the obtained results is expressed as an index value obtained by calculating a reciprocal thereof, with Standard Example being assigned the value of 100, and shown in rows of "Wet grip performance" in Tables 1 and 2. A larger index value indicates a shorter braking distance, and the index value of 102 or greater indicates excellent wet grip performance.

Performance on Snow

The pneumatic tire obtained as described above was mounted on a standard rim, inflated to an air pressure of 250 kPa, and mounted on a test vehicle. The test vehicle traveled on a road surface covered with pressed snow, and a braking distance when the test vehicle braked at an initial speed of 40 km/hour was measured. Each of the obtained results is expressed as an index value obtained by calculating a reciprocal thereof, with Standard Example being assigned the value of 100, and shown in rows of "Performance on snow" in Tables 1 and 2. A larger index value indicates a shorter braking distance, and the index value of 102 or greater indicates excellent performance on snow.

Steering Stability

The pneumatic tire obtained as described above was mounted on a standard rim, inflated to an air pressure of 250 kPa, and mounted on a test vehicle. The test vehicle traveled on a dry road surface with relatively less protrusions and recesses, and sensory evaluation in a scale of one to five was performed for the responsiveness of steering. The obtained results are shown in rows of "Steering stability" in Tables 1 and 2. A larger scale indicates superior steering stability. The scale of 4 or greater is preferred.

Rolling Resistance

The pneumatic tire obtained as described above was mounted on a standard rim, inflated to an air pressure of 210 kPa, and mounted on an indoor drum testing machine with a drum diameter of 1707 mm conforming to JIS D 4230, and the resistance was measured under a test load of 4.82 kN at a speed of 80 km/hour, as the rolling resistance. The obtained results are shown in rows of "Rolling resistance" in Tables 1 and 2 with Standard Example being assigned the value of 100. A smaller index value indicates a lower rolling resistance, and the index value of 98 or less indicates excellent low rolling resistance.

TABLE 1-1

|  |  | Standard Example | Example 1 | Example 2 | Example 3 | Example 4 |
|---|---|---|---|---|---|---|
| Modified SBR-1 | Parts by mass | 40 | 40 | 50 | 35 | 40 |
| Modified SBR-2 | Parts by mass | 55 (40) | 55 (40) | 55 (40) | 55 (40) | 55 (40) |
| Modified SBR-3 | Parts by mass |  |  |  |  |  |
| BR | Parts by mass | 20 | 20 | 10 | 25 | 20 |
| Carbon black | Parts by mass | 20 | 20 | 20 | 20 | 40 |
| Silica-1 | Parts by mass | 100 | 100 | 100 | 100 | 80 |
| Silica-2 | Parts by mass |  |  |  |  |  |
| Coupling agent-1 | Parts by mass | 10 |  |  |  |  |
| Coupling agent-2 | Parts by mass |  | 10 | 10 | 10 | 8 |
| Aroma oil | Parts by mass | 25 | 25 | 25 | 25 | 25 |
| Total amount of filler | (parts by mass) | (120) | (120) | (120) | (120) | (120) |
| Total amount of oil component | (parts by mass) | (40) | (40) | (40) | (40) | (40) |
| Ratio (oil/filler) | Mass % | 33 | 33 | 33 | 33 | 33 |
| Glass transition temperature | ° C. | −54 | −54 | −51 | −56 | −54 |
| Dry grip performance | Index value | 100 | 105 | 108 | 103 | 110 |

TABLE 1-1-continued

|  |  | Standard Example | Example 1 | Example 2 | Example 3 | Example 4 |
|---|---|---|---|---|---|---|
| Wet grip performance | Index value | 100 | 110 | 115 | 108 | 106 |
| Performance on snow | Index value | 100 | 105 | 102 | 109 | 105 |
| Steering stability | Rating | 3 | 4 | 4 | 4 | 5 |
| Rolling resistance | Index value | 100 | 90 | 87 | 93 | 97 |

TABLE 1-2

|  |  | Example 5 | Example 6 | Example 7 | Example 8 | Example 9 | Example 10 |
|---|---|---|---|---|---|---|---|
| Modified SBR-1 | Parts by mass | 40 | 40 | 40 | 40 | 40 | 40 |
| Modified SBR-2 | Parts by mass | 55 (40) | 55 (40) | 55 (40) | 55 (40) | 55 (40) |  |
| Modified SBR-3 | Parts by mass |  |  |  |  |  | 40 |
| BR | Parts by mass | 20 | 20 | 20 | 20 | 20 | 20 |
| Carbon black | Parts by mass | 10 | 20 | 20 | 20 | 20 | 20 |
| Silica-1 | Parts by mass | 110 | 100 | 100 | 20 | 40 | 100 |
| Silica-2 | Parts by mass |  |  |  | 80 | 60 |  |
| Coupling agent-1 | Parts by mass |  |  |  |  |  |  |
| Coupling agent-2 | Parts by mass | 11 | 10 | 10 | 10 | 10 | 10 |
| Aroma oil | Parts by mass | 25 | 20 | 35 | 25 | 25 | 40 |
| Total amount of filler | (parts by mass) | (120) | (120) | (120) | (120) | (120) | (120) |
| Total amount of oil component | (parts by mass) | (40) | (35) | (50) | (40) | (40) | (40) |
| Ratio (oil/filler) | Mass% | 33 | 29 | 42 | 33 | 33 | 33 |
| Glass transition temperature | °C. | −54 | −54 | −54 | −54 | −54 | −51 |
| Dry grip performance | Index value | 104 | 107 | 102 | 105 | 105 | 103 |
| Wet grip performance | Index value | 112 | 112 | 108 | 106 | 108 | 108 |
| Performance on snow | Index value | 105 | 103 | 112 | 105 | 105 | 103 |
| Steering stability | Rating | 4 | 5 | 4 | 4 | 4 | 4 |
| Rolling resistance | Index value | 88 | 92 | 88 | 85 | 88 | 93 |

TABLE 2-1

|  |  | Comparative Example 1 | Comparative Example 2 | Comparative Example 3 | Comparative Example 4 |
|---|---|---|---|---|---|
| Modified SBR-1 | Parts by mass | 30 | 55 | 40 | 40 |
| Modified SBR-2 | Parts by mass | 55 (40) | 55 (40) | 55 (40) | 55 (40) |
| BR | Parts by mass | 30 | 5 | 20 | 20 |
| NR | Parts by mass |  |  |  |  |
| Carbon black | Parts by mass | 20 | 20 | 60 | 20 |
| Silica-1 | Parts by mass | 100 | 100 | 60 | 100 |
| Coupling agent-2 | Parts by mass | 10 | 10 | 6 | 10 |
| Aroma oil | Parts by mass | 25 | 25 | 25 | 10 |
| Total amount of filler | (parts by mass) | (120) | (120) | (120) | (120) |
| Total amount of oil component | (parts by mass) | (40) | (40) | (40) | (25) |
| Ratio (oil/filler) | Mass % | 33 | 33 | 33 | 21 |
| Glass transition temperature | °C. | −57 | −49 | −54 | −54 |
| Dry grip performance | Index value | 100 | 110 | 115 | 110 |
| Wet grip performance | Index value | 102 | 118 | 103 | 114 |
| Performance on snow | Index value | 113 | 98 | 105 | 99 |
| Steering stability | Rating | 3 | 4 | 5 | 5 |
| Rolling resistance | Index value | 96 | 85 | 103 | 95 |

TABLE 2-2

|  |  | Comparative Example 5 | Comparative Example 6 | Comparative Example 7 |
|---|---|---|---|---|
| Modified SBR-1 | Parts by mass | 40 | 60 | 32 |
| Modified SBR-2 | Parts by mass | 55 (40) | 55 (40) | 55 (40) |
| BR | Parts by mass | 20 |  | 20 |
| NR | Parts by mass |  |  | 8 |
| Carbon black | Parts by mass | 20 | 20 | 20 |
| Silica-1 | Parts by mass | 100 | 100 | 100 |
| Coupling agent-2 | Parts by mass | 10 | 10 | 10 |
| Aroma oil | Parts by mass | 45 | 25 | 25 |
| Total amount of filler | (parts by mass) | (120) | (120) | (120) |
| Total amount of oil component | (parts by mass) | (60) | (40) | (40) |
| Ratio (oil/filler) | Mass% | 50 | 33 | 33 |
| Glass transition temperature | ° C. | −54 | −48 | −54 |
| Dry grip performance | Index value | 99 | 112 | 102 |
| Wet grip performance | Index value | 104 | 120 | 108 |
| Performance on snow | Index value | 115 | 95 | 105 |
| Steering stability | Rating | 3 | 4 | 3 |
| Rolling resistance | Index value | 86 | 84 | 95 |

TABLE 3

| Common formulation of rubber compositions | |
|---|---|
| Zinc oxide | 2.0 Parts by mass |
| Stearic acid | 1.0 Part by mass |
| Anti-aging agent-1 | 3.0 Parts by mass |
| Anti-aging agent-2 | 2.0 Parts by mass |
| Sulfur | 2.4 Parts by mass |
| Vulcanization accelerator-1 | 2.0 Parts by mass |
| Vulcanization accelerator-1 | 1.0 Part by mass |

For Tables 1-3, the types of the used raw materials are as follows.

Modified SBR-1: Modified styrene-butadiene rubber, NS612, available from Zeon Corporation, the modification group is a hydroxy group, styrene amount: 15%, vinyl amount: 31%, weight average molecular weight: 440000, glass transition temperature: −61° C.

Modified SBR-2: Modified styrene-butadiene rubber, TUFDENE E581, available from Asahi Kasei Corporation, the modification group is a hydroxy group, styrene amount: 36%, vinyl amount: 38%, weight average molecular weight: 1260000, glass transition temperature: −34° C.

Modified SBR-3: Modified styrene-butadiene rubber, NS116R, available from Zeon Corporation, the modification group is an amino group, styrene amount: 22%, vinyl amount: 63%, weight average molecular weight: 390000, glass transition temperature: −23° C.

BR: Butadiene rubber; Nipol BR1220, available from Zeon Corporation, glass transition temperature: −106° C.

NR: Natural rubber, STR 20, glass transition temperature: −70° C.

Carbon black: N-134, available from Thai Tokai Carbon

Silica-1: 9000GR, available from Evonik, CTAB adsorption specific surface area is 200 $m^2/g$ Silica-2: ULTRASIL 7000 GR, available from Evonik, CTAB adsorption specific surface area is 158 $m^2/g$ Coupling agent-1: Sulfide-based silane coupling agent, Si69, available from Evonik Degussa, bis(triethoxysilylpropyl)tetrasulfide Coupling agent-2: NXT silane, available from Evonik Degussa, 3-octanoylthio-1-propyltriethoxysilane Aroma oil: VivaTec 500, available from H&R Chemical Zinc oxide: Zinc Oxide III, available from Seido Chemical Industry Co., Ltd.

Stearic acid: beads stearic acid, available from NOF Corporation

Anti-aging agent-1: Santoflex 6PPD, available from Solutia Europe

Anti-aging agent-2: Pilnox TDQ, available from Nocil Limited

Sulfur: Golden Flower oil treated sulfur powder (sulfur content: 95.24 mass %), available from Tsurumi Chemical Industry Co., Ltd.

Vulcanization accelerator-1: NOCCELER CZ-G (CZ), available from Ouchi Shinko Chemical Industrial Co., Ltd.

Vulcanization accelerator-2: Soxinol D-G (DPG), available from Sumitomo Chemical Co., Ltd.

As can be seen from Tables 1 and 2, it was confirmed that the pneumatic tire obtained by each of the rubber compositions of Examples 1 to 10 achieved excellent dry grip performance, wet grip performance, performance on snow, steering stability, and low rolling resistance.

Because the pneumatic tire obtained in Comparative Example 1 contained the total amount of the two types of modified styrene-butadiene rubbers of less than 75 mass % and contained greater than 25 mass % of the butadiene rubber, the pneumatic tire had poor dry grip performance and steering stability.

Because the pneumatic tire of Comparative Example 2 had the glass transition temperature of the rubber composition for a tire of higher than −50° C., the pneumatic tire had poor performance on snow.

Because the pneumatic tire of Comparative Example 3 had the blended amount of the silica of less than 70 parts by mass, the pneumatic tire had a high rolling resistance.

Because the pneumatic tire of Comparative Example 4 had the ratio of the total amount of the oil component to the total mass of the filler including silica (in the tables, "Ratio (oil/filler)" of less than 25 mass %), the pneumatic tire had poor performance on snow.

Because the pneumatic tire of Comparative Example 5 had the ratio of the total amount of the oil component to the total mass of the filler including silica (in the tables, "Ratio (oil/filler)" of greater than 45 mass %), the pneumatic tire had poor dry grip performance and steering stability.

Because the pneumatic tire of Comparative Example 6 contains no butadiene rubber, the pneumatic tire had poor performance on snow.

Because the pneumatic tire of Comparative Example 7 contained the total amount of the two types of modified styrene-butadiene rubbers of less than 75 mass % and contained 8 mass % of the natural rubber, the pneumatic tire had poor steering stability.

The invention claimed is:

1. A pneumatic tire formed by molding a rubber composition for a tire,
the rubber composition containing:
from 70 to 150 parts by mass of silica per 100 parts by mass of a diene rubber formed from two types of modified styrene-butadiene rubbers and a butadiene rubber, and an oil, and
from 5 to 15 mass % of 3-octanoylthio-1-propyltriethoxysilane with respect to a mass of the silica,
the diene rubber containing 75 mass % or greater and less than 100 mass % total of the two types of modified styrene-butadiene rubbers and greater than 0 mass % and 25 mass % or less of the butadiene rubber,
a total amount of oil component containing the oil being from 25 to 45 mass % of a total mass of filler containing the silica, and
a glass transition temperature being −50° C. or lower, wherein
both weight average molecular weights of the two types of modified styrene-butadiene rubbers are 400000 or greater, and a difference between glass transition temperatures of the two types of modified styrene-butadiene rubbers is 20° C. or higher.

2. The pneumatic tire according to claim 1, wherein at least one of the two types of modified styrene-butadiene rubbers contains a hydroxy group.

3. The pneumatic tire according to claim 1, wherein, as the silica, silica having a CTAB adsorption specific surface area of 140 $m^2/g$ or greater and less than 180 $m^2/g$ and silica having a CTAB adsorption specific surface area of from 180 $m^2/g$ to 250 $m^2/g$ are blended.

4. A pneumatic tire for all seasons, the pneumatic tire being a pneumatic tire according to claim 1 and comprising a tread portion formed by molding the rubber composition for a tire.

5. The pneumatic tire according to claim 2, wherein, as the silica, silica having a CTAB adsorption specific surface area of 140 $m^2/g$ or greater and less than 180 $m^2/g$ and silica having a CTAB adsorption specific surface area of from 180 $m^2/g$ to 250 $m^2/g$ are blended.

6. A pneumatic tire for all seasons, the pneumatic tire being a pneumatic tire according to claim 5 and comprising a tread portion formed by molding the rubber composition for a tire.

* * * * *